July 22, 1969 T. V. BLALOCK 3,457,516

DOUBLE DELAY-LINE FILTERS FOR PULSE AMPLIFIERS

Filed March 14, 1966 3 Sheets-Sheet 1

INVENTOR.
Theron V. Blalock
BY
[signature]
ATTORNEY.

DOUBLE DELAY-LINE FILTERS FOR PULSE AMPLIFIERS

Filed March 14, 1966 3 Sheets-Sheet 2

INVENTOR.
Theron V. Blalock
BY
Roland A. Anderson
ATTORNEY.

July 22, 1969 T. V. BLALOCK 3,457,516

DOUBLE DELAY-LINE FILTERS FOR PULSE AMPLIFIERS

Filed March 14, 1966 3 Sheets-Sheet 3

INVENTOR.
Theron V. Blalock

BY

Roland A. Anderson

ATTORNEY.

United States Patent Office 3,457,516
Patented July 22, 1969

3,457,516

DOUBLE DELAY-LINE FILTERS FOR PULSE AMPLIFIERS

Theron V. Blalock, Knoxville, Tenn., assignor to the United States of America as represented by the United States Atomic Energy Commission Filed Mar. 14, 1966, Ser. No. 535,657
Int. Cl. H03b *1/04;* H03k *5/08;* H04b *1/10*
U.S. Cl. 328—165 2 Claims

ABSTRACT OF THE DISCLOSURE

A partially gated double delay-line filter has been provided to circumvent the poor noise performance of conventional double delay-line filters for nuclear pulse amplifiers. The operating principle of the present filter is to alter the noise spectrum stored in the delay lines prior to a pulse arrival. A gating arrangement wherein the noise spectrum stored in the first delay line filter is eliminated from the second delay line filter prior to the pulse arrival. High frequency noise rejection is further accomplished at the input of the first delay line filter by gating a selective portion of the noise spectrum signal through an inverter and subtracting this signal from the input prior to the pulse arrival.

Figure 1:
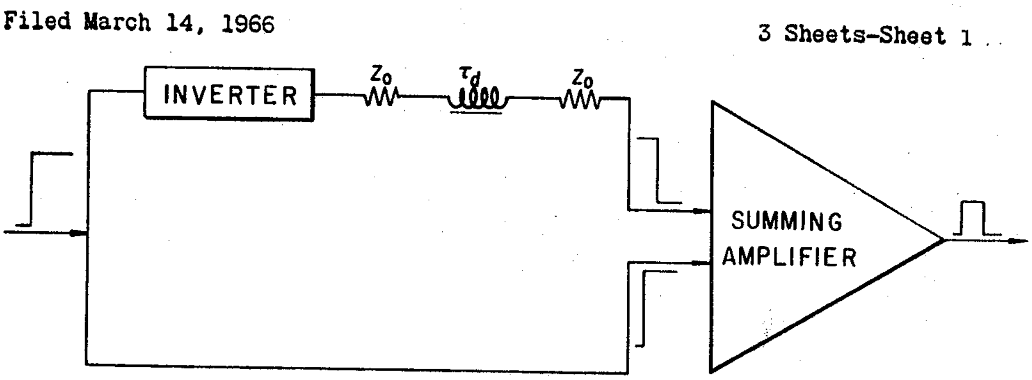

The invention described herein was made in the course of, or under a contract with the U.S. Atomic Energy Commission.

This invention relates to double delay-line filters, and more particularly to an arrangement for minimizing noise in pulse shaping with double delay-line filters.

In the general field of nuclear instrumentation, and particularly amplifiers associated therewith, it is common practice to utilize double delay-line filters as a means of producing symmetrical bipolar pulses, Fairstein, 2,922,036; Fairstein et al., 3,072,851. Despite the many advantages of this type of pulse shaping, it has certain noise limitations, particularly for fast response.

The advantage of the bipolar output pulse of the double delay-line filter is often offset by the disadvantage of high ENV (equivalent noise voltage). The delay-line bridge alters the output noise spectrum from the input section of a typical nuclear pulse preamplifier in such a manner that the average noise power per c.p.s. passed by a perfect low-pass network is increased as the cutoff frequency is increased and is decreased as the cutoff frequency is decreased. Thus, when a fast pulse is required, the ENV is especially high.

In a conventional double delay-line pulse shaping circuit, noise stored in the delay-line combines with the noise superimposed on the input signal to the filter. This is affected in such a way that the power in the low frequency noise on the input signal is decreased in the output signal, while the power in the high frequency noise is increased. Where noise is stored in a single delay-line filter, particularly in the higher frequencies, it may be removed within satisfactory limits by a low-pass RC filter network coupled to the output thereof. However, where noise is stored in both delay-lines of a double delay-line filter, it cannot be effectively removed in this way.

Applicant with a knowledge of these problems of the prior art has for an object of his invention the provision of a system for minimum noise pulse shaping with double delay-line filters in nuclear pulse amplifiers.

Applicant has as another object of his invention the provision of a delay-line filter gated to alter the noise spectrum stored in the delay-line prior to the arrival of a signal.

Applicant has as another object of his invention the provision of a double delay-line filter for pulse amplifiers wherein a normally closed gate is employed to couple the two delay-lines to affect partial gating and obviate storage of the filter input-noise spectrum in the second delay-line prior to signal arrival.

Applicant has as a further object of his invention the provision of a double-delay line filter for pulse amplifiers wherein the signal-to-noise ratio is improved by injecting a low frequency or selected noise spectrum into the filter prior to the arrival of the signal.

Other objects and advantages of my invention will appear from the following specification and accompanying drawings, and the novel features thereof will be particularly pointed out in the annexed claims.

Figure 2:
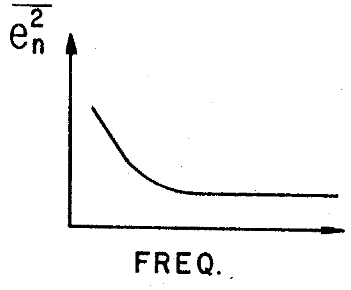
Figure 3:
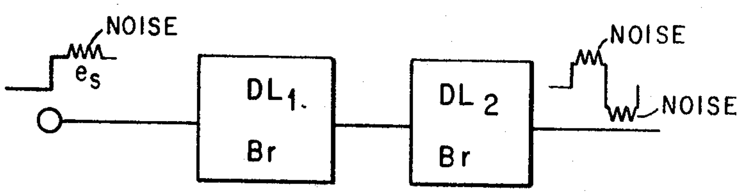
Figure 4:
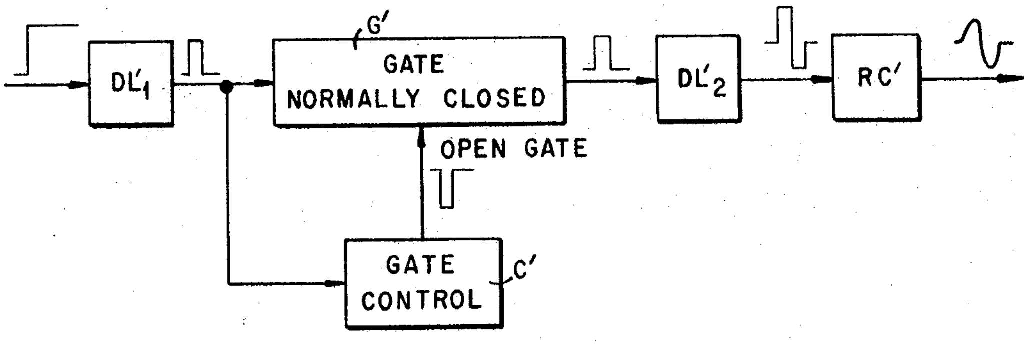
Figure 5:
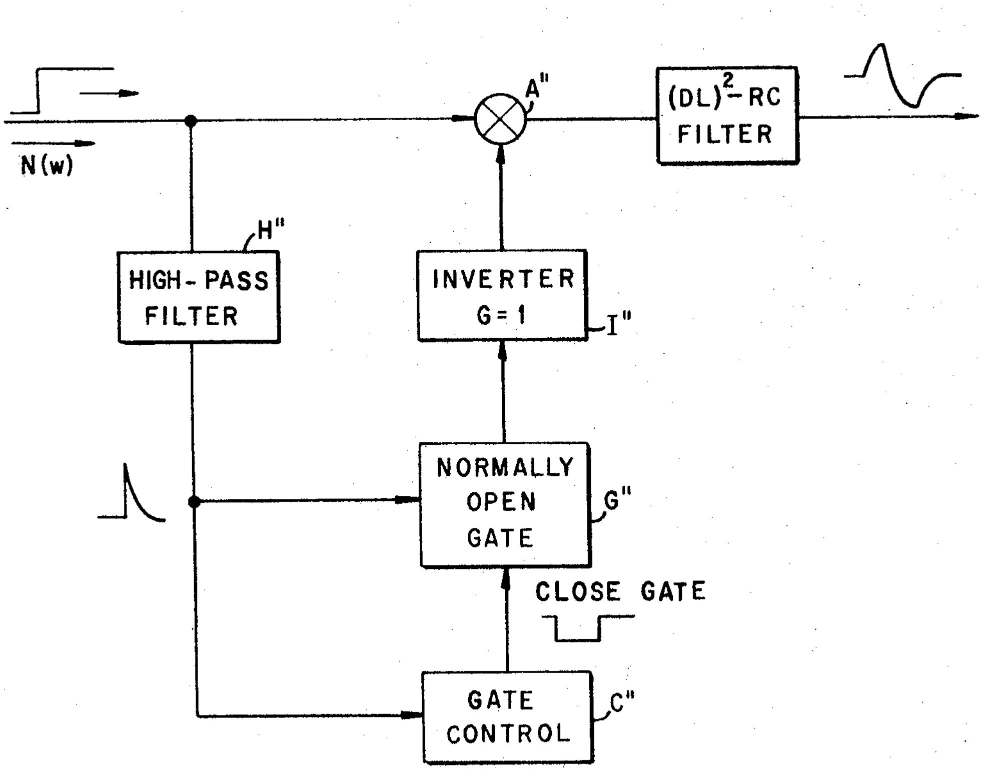
Figure 6:
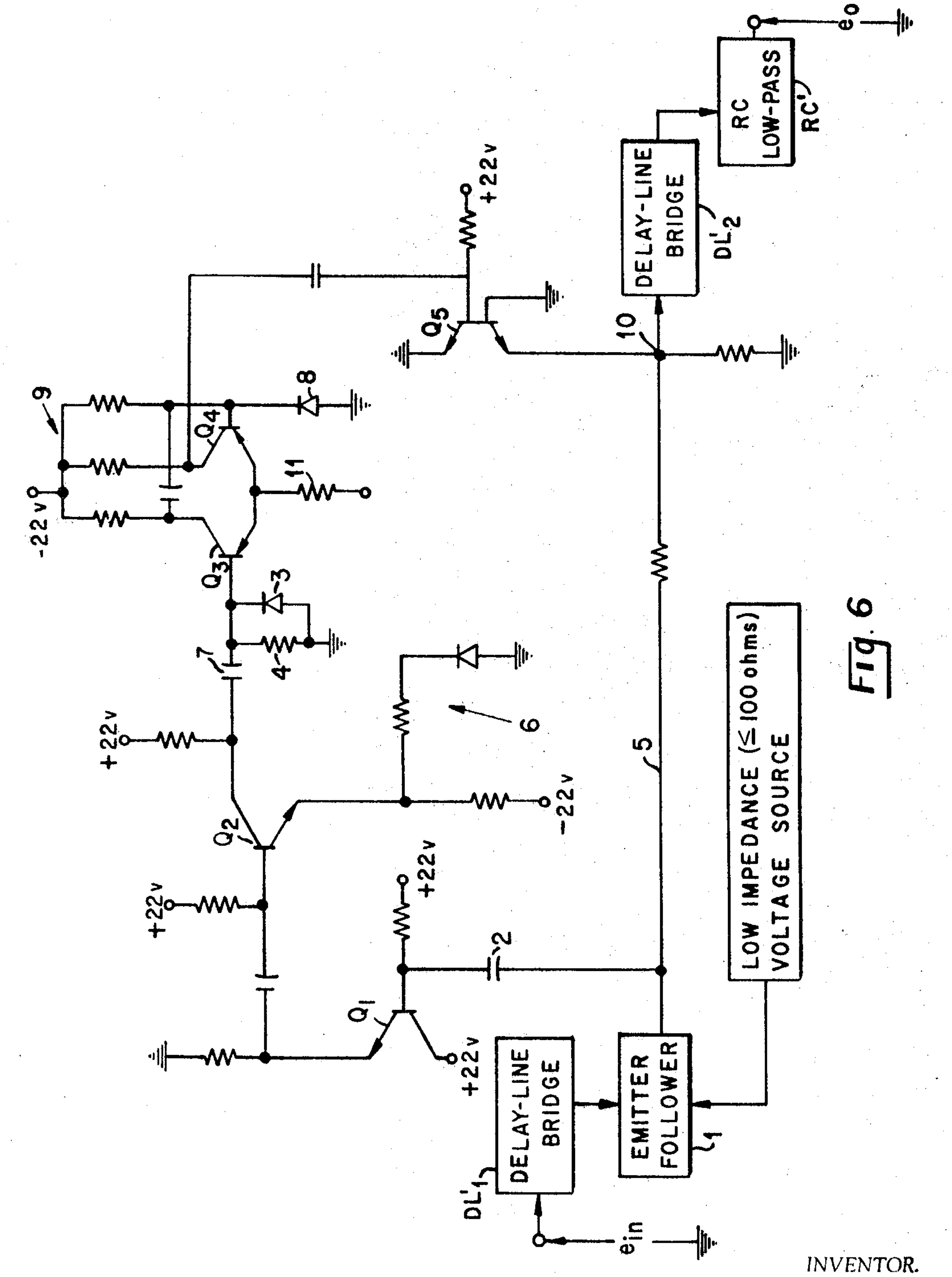

In the drawings, FIG. 1 is a schematic diagram of a conventional delay-line bridge. FIG. 2 is a graph showing the general shape of the noise spectrum from a preamplifier in a pulse amplifier circuit. FIG. 3 is a block diagram of a conventional double delay-line filter. FIG. 4 is a block diagram of a partially gated double delay-line filter developed to accomplish the above-stated objects. FIG. 5 is a block diagram of a gated double delay-line filter, also to accomplish the above-stated objects, utilizing selective noise injection. FIG. 6 is a schematic circuit diagram of one embodiment of the filter of FIG. 4.

Consider the delay-line bridge shown in FIG. 1. Let the gains of the inverter and of the summing amplifier be set so that the pulse gain of the bridge is unity. Let the power-spectral density of the input be white, that is $$N\omega = N \text{ (mean-squared volts/rad./sec.)} = \text{const.}$$

If the delay-line is disconnected, the output noise of the filter in the frequency interval $(0, \omega_h)$ will be $$N_0 \text{ (mean-squared volts)} = N\omega_h$$

The voltage transfer function of the delay-line bridge is $$T(j\omega) = 1 - \epsilon^{-j\omega\tau_d}$$

where $\tau_d$ is the delay-line length in seconds. Therefore, with the delay line connected, the output noise in $(0, \omega_h)$ is given by $$N_{01} = N\int_0^{\omega_h} |1-\epsilon^{-j\omega\tau_d}|^2 d\omega$$

$$= (2N/\tau_d)(\omega_h\tau_d - \sin\omega_h\tau_d) \quad \text{(a)}$$

Equation *a* shows that the output noise power in a low frequency interval $(\omega_h \ll 1/\tau_d)$ is reduced to values much less than $N\omega_h$, while as the interval extends into high frequencies $(\omega_h \gg 1/\tau_d)$, the output noise power approaches the value $2N\omega_h$.

When two delay-line bridges are cascaded, the pulse gain is again unity, and the output noise for disconnected delay-lines is again $N_0 = N\omega_h$ in the frequency interval $(0, \omega_h)$. With the delay-lines connected, the output noise in $(0, \omega_h)$ is $$N_{02} = N\int_0^{\omega_h} |(1-\epsilon^{-j\omega\tau_d})^2|^2 d\omega$$

$$= (6N/\tau_d)[\tfrac{4}{3}\sin^3(\omega_h\tau_d/2)\cos(\omega_h\tau_d/2) + \omega_h\tau_d - \sin\omega_h\tau_d] \quad \text{(b)}$$

Taking the limits $\omega_h \to 0$ and $\omega_h \to \infty$ in Equation *b* for $\tau_d$ finite and nonzero shows that at low frequencies $N_{02} < N\omega_h$ and at high frequencies $N_{02} \to 6N\omega_h$.

Thus, if the noise spectrum superposed on the input signal is white and the system bandwidth increases to accommodate higher frequencies (shorter risetime pulse) the ENV of a delay-line bridge increases by a factor that approaches the value $\sqrt{2}$, and the ENV of two cascaded bridges increases by a factor approaching the value $\sqrt{6}$.

The situation is reversed at lower frequencies where both the single delay-line bridge and two cascaded bridges reduce the ENV.

A typical noise spectrum from a preamplifier is shown in FIG. 2. When two cascaded delay-line bridges are conventionally connected, and a step pulse $e_s$, with noise superimposed upon it is fed to the input from such a preamplifier as shown in attached FIG. 3, the signal at the output is as shown. The effect of the two bridges is to decrease the noise in the low frequency spectrum and increase it in the high frequency spectrum. The noise stored in the delay-line combines with noise superimposed on the input signal to the filter. The LF noise on the input signal is combined with the stored noise in the bridges so that the LF noise spectrum of the output signal is reduced, but the HF noise is increased. However, the noise output from a single delay-line can be reduced or minimized by feeding into an RC filter, but if fed through a double delay-line bridge the problem cannot be satisfactorily met with an RC filter and is compounded more than by a power of 2.

Referring now to FIG. 4, a partially gated double delay-line filter is illustrated for modifying the noise spectrum stored in a filter. A normally closed gate circuit G′ is provided between the two delay-line bridges $DL'_1$ and $DL'_2$. This gate assures that no portion of the filter input noise spectrum is stored in the delay-line of the second bridge $DL'_2$ prior to the arrival of the desired signal. The gate G′ is opened by gate control C′ on the lead edge and closed on the trailing edge of the pulse from the first delay-line bridge. Through this arrangement, the equivalent noise voltage (ENV) of each half of the output bipolar pulse is the same as that for a conventional single delay-line filter. Furthermore, the minimum noise conditions are unaffected by the second bridge and are therefore identical to the single delay-line filter. The sole function of the second delay-line bridge in this filter is to supply the second half of the bipolar output pulse.

This partial gating with the system of FIG. 4 using the circuit embodiment shown in FIG. 6, where the characteristics thereof were obtained by measuring the noise line width (NLW) of an experimental preamplifier using a pulse-height analyzer, indicated improved performance. For conditions where the delay-line length (in seconds) matched the time constant of the output RC network in the filter, the NLW for the new filter unit was improved (reduced) by about 20%. This condition of equal time constants is considered optimum for conventional filter units. The shape of the output pulse, however, was not ideal. When conditions were adjusted for an optimum output pulse shape, the improvement in the NLW increased to at least 36% and as much as 42% at shorter time constants.

The circuit of FIG. 6 represents a preferred embodiment of the modification of the invention shown in FIG. 4. The detailed circuitary is that of the gate G′ and the gate control C′ of FIG. 4, indicating that the first delay-line $DL'_1$ terminates in an emitter follower 1 which serves as an isolating circuit. Coupled to the output of the emitter follower 1 through a capacitor 2 is an emitter follower transistor $Q_1$ employed to isolate the gate drive circuit including transistors $Q_2$, $Q_3$ and $Q_4$ from the signal path 5 between the two delay-line bridges $DL'_1$ and $DL'_2$.

Transistor $Q_2$ is an amplifier limiter and serves to amplify the signal pulse from transistor $Q_1$. The emiter circuit 6 of transistor $Q_2$ limits the voltage excursion at the collector of transistor $Q_2$. The RC coupling circuit 4, 7 differentiates the output signal from transistor $Q_2$. The differentiated signal is then fed to the trigger pair $Q_3$, $Q_4$, and to the associated circuit 9. The transistors $Q_3$, $Q_4$ of the trigger pair, have their emitter tied together, and are coupled to a positive potential through resistor 11. The two diodes 3, 8 are employed to set the voltage of the bases of transistors $Q_3$, $Q_4$ near ground potential.

The noise of the system, which appears in line 5, is not of sufficient amplitude, to operate the above circuit. Point 10 in line 5 remains near ground. The gate remains closed and the noise cannot get through to delay-line $DL'_2$. A signal operates the control circuit and cuts of transistor $Q_5$ and opens the gate permitting the signal to pass.

Another modification of a gated double delay-line filter, as investigated for improving the signal-to-noise ratio, is that utilizing selective nose injection. The object is to inject the low frequency portion of the noise spectrum into the filter prior to the arrival of the signal. This also can result in a substantial reduction in NLW. A circuit for accomplishing this is shown in block form in FIG. 5. This low frequency injection is accomplished by degrading the high frequencies. The high frequency portion of the noise spectrum is selected by a high-pass filter H″, fed through a normally open gate G″, inverted by inverter I″ and then summed by amplifier A″ at the input to the double delay-line filter. This, in essence, leaves predominantly only the low frequency noise in the double delay-line filter. The leading edge of the signal pulse is used to operate the gate-control trigger C″ which, in turn, closes the gate G″. This prevents the degradation of the signal pulse which otherwise would also be fed through the gate G″ and inverter I″.

The gate G″ and control circuit C″ are identical to gate G′ and control circuit C′, respectively, with the exception of an opposite conductive type transistor $Q_5$ to provide the reverse order control signal as shown in FIG. 5.

In operation, a pulse, such as the step $e_s$ (FIG. 3), is applied to the input of the first delay-line bridge $DL'_1$. The bridge divides the signal current, FIG. 1, so that a portion of the current is fed directly to one input of the summing amplifier while a second portion is inverted and delayed for a time $T_d$ and applied to the second input of the summing amplifier. The output of the summing amplifier is a unipolar rectangular pulse. This unipolar pulse is applied to the emitter follower 1 (FIG. 6) which isolates the output of the first delay line ($DL'_1$) from the input of the second delay line ($DL'_2$). The output from the emitter follower 1 is appiled to line 5 and to the base of transistor $Q_1$ through capacitor 2. Transistor $Q_1$ is connected in an emitter follower configuration and thus operates to isolate, from an impedance matching standpoint, the gating circuit from the signal path 5 and is biased so that noise amplification is not sufficient to operate the gate. The pulse is then amplified by means of transistor amplifier $Q_2$ and coupling circuits 4, 7, respectively, to operate the trigger pair transistors $Q_3$ and $Q_4$. The trigger pair $Q_3$, $Q_4$ is turned off by the differentiated positive pulse which reverse biases the base of transistors $Q_3$ and $Q_4$. The limiting circuit connected to the emitter of $Q_2$ operates to limit the reverse biasing voltage so that the switching speed of $Q_3$ and $Q_4$ is not impeded by a high reverse bias voltage. Since the bases of transistors $Q_3$ and $Q_4$ are held at ground potential by diodes 3 and 8, respectively, the positive pulse insures that the trigger circuit is held non-conductive for the duration of the input unipolar pulse. When $Q_4$ is turned "off" a negative gate control voltage is applied to one of the base leads of the gating transistor $Q_5$ turning it off, thereby removing the terminal 10 from ground potential and allowing the pulse on line 5 to pass to delay line bridge $DL'_2$. By holding terminal 10 near ground potential prior to the arrival of a pulse from $DL'_1$ the noise appearing at the filter input is not stored in the second delay line bridge $DL'_2$; consequently, the ENV of each half of the filter output bipolar pulse is the same as that of the conventional delay line bridge-RC filter output.

As pointed out above, further noise rejection is accomplished by altering the filter input noise spectrum as shown in FIG. 5. The gate control C″ operation is identical to that of gate control C′, but in this case the normally open gate G″ is a transistor $Q_5$ of opposite conductivity type such that when the negative pulse from the gate control circuit is applied to the base lead the transistor conducts thereby grounding the input of inverter I″ during the duration of an input pulse. The high-pass filter H″ passes the noise signal above a predetermined frequency depending upon the delay line filter time constants. Prior to the arrival of a pulse at the filter input the high frequency noise components are eliminated since the high frequency components are fed through gate G″ to inverter I″, without gain, and substracted from the input noise signal at the summing circuit A″. The leading edge of an input pulse activates the gate control circuit C″ in the same manner as discussed above for gate control circuit C′, thereby providing a negative going pulse for the duration of the input pulse applying ground potential to the input terminal of inverter I″. This action effectively removes the gating circuitry from the input circuit thereby allowing a pulse to pass unaltered.

Having thus described my invention, I claim:

1. A double delay-line filter for a nuclear pulse amplifier comprising:

a pair of cascaded delay-line bridges; and a gating means coupling the output of a first of said delay-line bridges to the input of a second of said delay-line bridges for blocking noise signals from said second delay-line bridge prior to the arrival of a pulse from said first delay-line bridge and operable in response to the leading edge of a pulse from said first delay-line bridge to pass said pulse to the input of said second delay-line bridge.

2. A double delay-line filter as set forth in claim 1 wherein said gating means includes a first emitter follower amplifier connected in series with the output of said first delay-line bridge, a signal line connecting the output of said first emitter follower to the input of said second delay-line bridge, a second emitter followed connected to the output of said first emitter follower, an amplifier limiter coupled to the second emitter follower, a gating transistor coupled to said signal line at the input of said second delay-line bridge, a trigger pair for operating said gating transistor, and a differentiating circuit for coupling said trigger pair to said amplifier limiter.

References Cited

UNITED STATES PATENTS

| | | | |
|---|---|---|---|
| 2,259,532 | 10/1941 | Nicholson | 328—165 |
| 2,523,283 | 9/1950 | Dickson | 324—77 |
| 2,580,148 | 12/1951 | Wirkler | 324—77 |
| 2,896,162 | 7/1959 | Berger | 324—77 |
| 2,922,036 | 1/1960 | Fairstein | 328—115 |
| 2,997,650 | 8/1961 | Appelbaum | 324—77 |
| 3,126,449 | 3/1964 | Shirman | 328—165 |
| 3,193,681 | 7/1965 | Schwarz | 328—165 |
| 3,231,823 | 1/1966 | Garfield | 328—165 |

ARTHUR GAUSS, Primary Examiner

H. A. DIXON, Assistant Examiner